United States Patent [19]

Ritchey

[11] 4,184,453
[45] Jan. 22, 1980

[54] EAR TAG LOCKING DEVICE

[76] Inventor: Eugene B Ritchey, Rte. 3, Box 58, Brighton, Colo. 80601

[21] Appl. No.: 878,076

[22] Filed: Feb. 15, 1978

[51] Int. Cl.$^2$ ............................................. A01K 13/00
[52] U.S. Cl. ..................................... 119/156; 40/301
[58] Field of Search ........................... 119/156; 40/301

[56] References Cited

U.S. PATENT DOCUMENTS

| | | | |
|---|---|---|---|
| 3,552,051 | 1/1971 | Ritchey | 40/301 |
| 3,595,201 | 7/1971 | Dumas | 40/301 X |
| 3,867,777 | 2/1975 | Potter | 40/301 |
| 3,934,368 | 1/1976 | Fearing | 40/301 |
| 3,959,908 | 5/1976 | Lowe | 40/301 |
| 4,000,744 | 1/1977 | Ritchey | 40/301 X |
| 4,059,074 | 11/1977 | Fürer et al. | 119/156 |

*Primary Examiner*—Russell R. Kinsey
*Assistant Examiner*—Daniel J. Leach

*Attorney, Agent, or Firm*—Sheridan, Ross, Fields & McIntosh

[57] ABSTRACT

A locking device, in combination with a self-locking tag, insertable through a slit in the ear of an animal, includes a disc with a centrally disposed slit for more securely attaching the tag to the animal. Similar to the function of a pedestal, the device may also support the tag in an essentially upright position in the animal's ear. In addition, two locking devices may be utilized on both sides of the ear to prevent the tripping of the tag from either side of the ear. Another salient feature of the locking device is that it may be of a color which provides information concerning the animal. Additionally, the device may be impregnated with an insecticide repellent which will bleed out over a period of time thereby providing a measure of control over flies, lice, and other insects that may come near the animal's ear.

5 Claims, 7 Drawing Figures

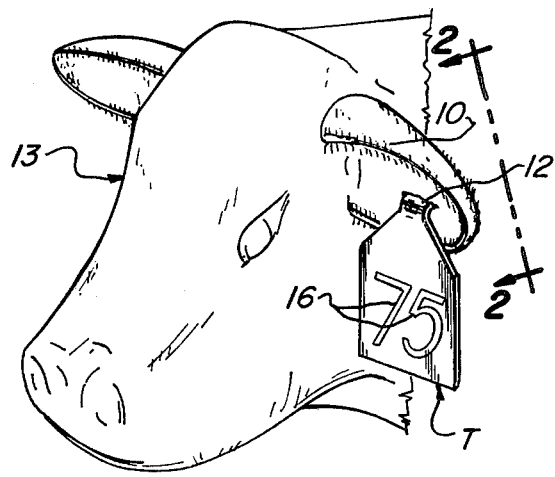
Fig_1
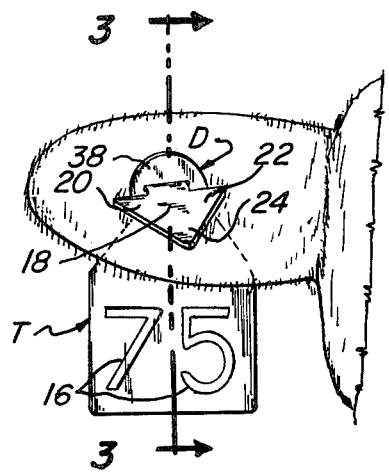
Fig_2
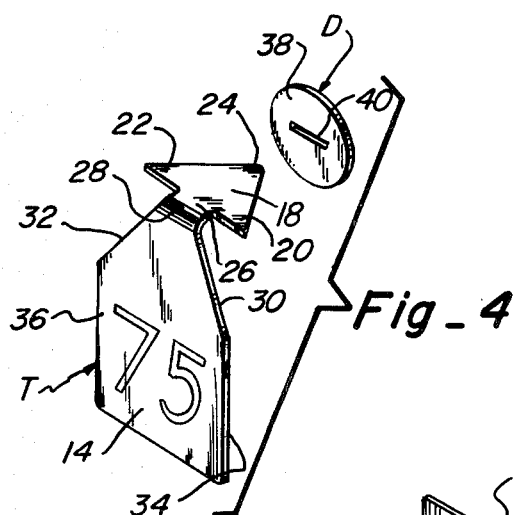
Fig_4
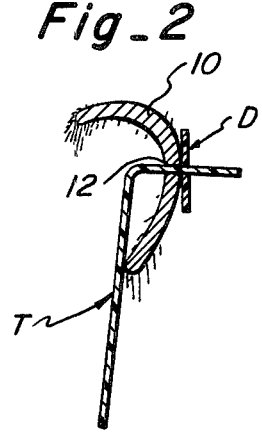
Fig_3
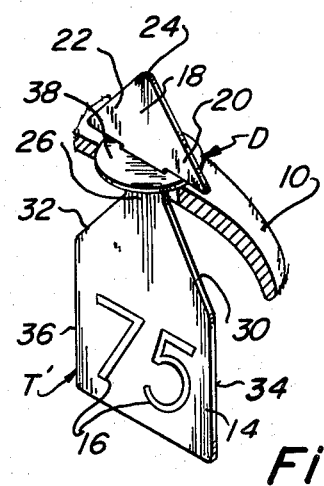
Fig_6
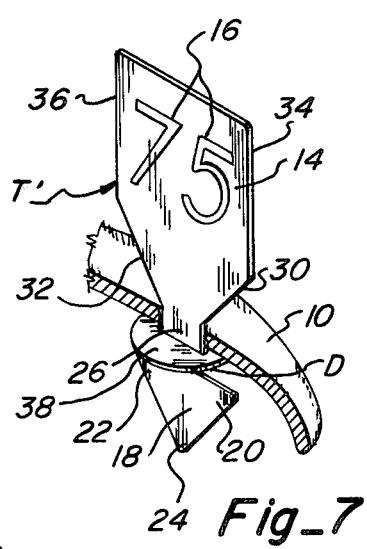
Fig_7
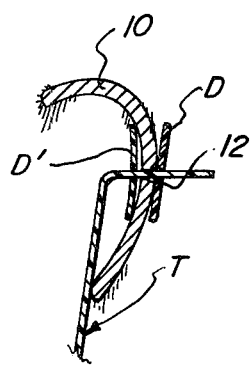
Fig_5

EAR TAG LOCKING DEVICE

BACKGROUND OF THE INVENTION

1. Field of the Invention

This invention relates to a locking device for a tag and more particularly to an improved locking device for holding an identification tag more securely in the ear of an animal.

2. Description of the Prior Art

A number of livestock identification tags and means for inserting and holding them in the ear of an animal have been developed. In U.S. Pat. No. 3,959,908 to Lowe, a livestock identification tag is shown which is inserted through the ear of an animal and held there by a locking tab. In U.S. Pat. No. 3,595,201 to Dumas, an identification tag is also shown utilizing a locking member to hold the tag in the ear of an animal. A New Zealand Company, Delta Plastics, Ltd., markets an animal identification tag called the "Allflex" system. The "Allflex" includes a circular locking member which holds the tag in the ear. Applicant also invented an ear tag for use on livestock as disclosed in U.S. Pat. No. 3,552,051. The advantage of this ear tag is its flexibility which permits the tag to be easily inserted in the ear and pulled from it should the tag become caught on a fence or the like. Unlike these other identification ear tags, the Ritchey tag is self-locking since it is held in the ear without additional connecting or locking parts. Even when this advantage, however, it was found that in cold weather the Ritchey self-locking ear tag may become more rigid and if caught on an obstruction, could tear the ear of the animal as the tag is pulled from the obstruction. Therefore, the locking device described here provides an improved means for holding the Ritchey self-locking tag in the animal's ear.

SUMMARY OF THE INVENTION

In accordance with the present invention, a self-locking identification tag including an anchoring head, a marking panel, and a skin traversing portion joining the anchoring head and marking panel is provided in combination with an improved locking device. The locking device has an aperture through which the anchoring head is inserted and the device is releasably held on the skin traversing portion of the tag. The anchoring head, the marking panel and the locking device provide means to hold the skin traversing portion of the tag in a slit in an animal's tissue.

More particularly, the combination of a self-locking loopless identification tag for insertion into a slit in the ear or like tissue of an animal and an additional locking device therefor is provided. The tag includes a pair of laterally extending resilient rearwardly diverging securing ledges coming to a rounded point and forming a delta-shaped anchoring head, a marking panel of larger lateral dimension than the securing ledges for carrying identifying indicia, and a skin traversing portion joining the anchoring head and marking panel together. The securing ledges can be folded and, because of their resiliency, unfold after passing through a slit in an animal's tissue. The anchoring head portion adjacent to the skin traversing portion and the marking panel portion adjacent to the skin traversing portion form means to hold the tag in the slit.

The locking device is a generally circular elastic disc having a centrally disposed slit therein. The ledges of the anchoring head of the tag can be inserted through the aperture. The disc is generally perpendicular to the plane of the anchoring head of the tag when the disc is releasably held on the skin traversing portion of the tag. The disc while on the skin traversing portion, forms additional means to hold the tag in the slit in the animal's tissue. Additionally, the disc may be impregnated with an insecticide repellent which will bleed out over a period of time to continuously apply insecticide to the animal. This has particular application in the control of lice in the ears of cattle. Also, the disc may be of a color which is the same or different than that of the tag to serve as a code to provide information concerning the animal.

From the foregoing, the advantages of the invention are readily apparent. A locking device for self-locking identification tags inserted through a slit in the ear or other tissue of an animal has been provided. The device is held on the skin traversing portion of the tag to more securely hold the tag in the ear. The possibility of the tag tripping out of the ear is substantially reduced, particularly, when the tag becomes caught on an obstruction and the animal attempts to pull away from it. In other words, the locking device cooperates with the anchoring head to more securely hold the tag in place on the animal than was heretofore possible with a self-locking ear tag. In one embodiment of the combination in the animal's ear, the locking device is perpendicular to the plane of the marking panel. In addition to holding the tag in the slit, the device acts similarly to a pedestal supporting the tag in an essentially upright position thereby diminishing any wobbling motion of the tag in the ear as the animal moves. Furthermore, the device may contain an insecticide that is secreted over a period of time to aid in the control of flies, lice, and other insects that may come near the face or ears of the animal. Also, the device may be colored in such a manner to provide desired information on the animal, such as the type of insecticide impregnated in the device or the identity of a group of animals based on the particular color of the device held in the animal's ear.

Additional advantages of this invention will become apparent from the description which follows, taken in conjunction with the accompanying drawings.

BRIEF DESCRIPTION OF THE DRAWINGS

FIG. 1 is the perspective view of the head of an animal having a tag constructed in accordance with this invention inserted in its left ear;

FIG. 2 is an enlarged rear view of the animal's ear, taken along lines 2—2 of FIG. 1, showing the head of the tag projecting through the ear with the improved locking device of this invention connected to the tag;

FIG. 3 is a vertical cross section, taken along the lines 3—3 of FIG. 2, showing the tag inserted through the ear and the improved locking device of this invention, which is held on the back of the ear;

FIG. 4 is an exploded perspective view of the tag and improved locking device of this invention;

FIG. 5 is a vertical section, similar to FIG. 3, but showing an alternative embodiment having a locking device on each side of the animal's ear;

FIG. 6 is a perspective view of the head of an animal showing another form of tag inserted upwardly through the top of its ear with the improved locking device connected to the tag on the outside of the ear and serving as a pedestal to support the tag;

FIG. 7 is a perspective view of the head of an animal similar to FIG. 6, but showing an alternative embodiment having the tag inserted downwardly through the top of its ear with the improved locking device connected to the tag at the inside of the ear to act as a pedestal to support the tag.

DESCRIPTION OF THE PREFERRED EMBODIMENTS

In accordance with this invention, FIG. 1 shows a selflocking loopless flexible identification tag T held in a slit 12 in the ear 10 of an animal 13. This type of tag is commonly being used in the identification of cattle. FIG. 2 illustrates the combination of the tag and locking device D more securely holding the tag in the animal's ear.

FIG. 4 shows a flexible identification tag conveniently formed of carbon black filled polyurethane and in overall dimension is approximately three inches by four and three quarter inches in length. As seen in FIG. 4, the identification tag T comprises a pair of resilient or bendable laterally extending rearwardly diverging securing ledges 20 and 22 which come to a rounded point 24 and form a delta shaped anchoring or locking head 18. A marking panel 14 of the tag is a generally symmetrical five sided member with a larger lateral dimension than the securing ledges 20 and 22 and carries identifying indicia 16. A marking panel is formed as two sloping shoulders 30 and 32, one shoulder projecting from each side of the base of neck or skin traversing portion 26, and joining with sides 34 and 36 respectively. The marking panel 14 and the laterally extending securing ledges 20 and 22 are joined together by the skin traversing portion. The relatively narrower skin traversing portion or neck 26 of the tag has a fold 28 located generally at the neck's midportion. The fold causes the anchoring head to be aligned in a generally perpendicular relationship with the plane of the marking panel as best seen in FIG. 4. In one embodiment of this invention, the width of the skin traversing portion is 11/16 of an inch. It is this portion of the identification tag that extends through slit 12 as shown in FIG. 1.

As best seen in FIG. 4, locking device D includes a disc 38 preferably circular in shape with an elongated aperture or slit 40 located in the center of the disc. It can be seen that the device D may be of any non-circular shape provided that the device has an opening through which the tag may be inserted. The device is conveniently made from an elastic or resilient material, approximately 1/16ths of an inch in thickness, which may be of a resiliency different from that of the tag T. Preferably, the aperture 40 is at least dimensionally equal to the cross-sectional dimension or width of the skin traversing portion 26 of the tag. The device, then, will be tightly held on the neck of the tag whenever the device is mounted on the tag. Additionally, the aperture is dimensionally less than the marking panel 14 and the portion of the anchoring head where the skin traversing portion 26 joins with the anchoring head 18. The device D, therefore, cannot be easily pulled from the tag whenever the device is mounted on the tag. Furthermore, an insecticide can be impregnated into the locking device which is automatically secreted over time to control flies, lice and other insects that may come near an animal on which the device is held. Also, the color of the device may provide coded information. The color of the device may designate a type of insecticide impregnated therein or the color may indicate a group of animals having special characteristics previously defined by the user of the device.

To position the device D on the tag, the securing ledges 20 and 22 of the tag are first over folded upon the center portion of anchoring head 18. The folded securing ledges are then inserted into aperture 40. The disc 38 is manually moved down the anchoring head toward the skin traversing portion 26 of the tag until the anchoring head is forced completely through the aperture. Once the head is through the aperture, the securing ledges automatically unfold. The device is then releasably held on the skin traversing portion of the tag between the securing ledges and anchoring head in a generally parallel relationship to the plane of the marking panel. The result of inserting the device on the tag after the tag has been inserted through an animal's ear is shown in FIGS. 2 and 3. It can be seen that locking device D greatly minimizes the ability of the tag to trip out of the slit in the ear.

Various means may be utilized to insert the tag through an ear or other tissue of an animal and concurrently fix the device on the tag. Conveniently, the methods and tools shown in U.S. Pat. Nos. 3,552,051 and 4,000,744 to Ritchey may be used. To insert a tag in an animal's ear 10, based on the Ritchey patents, the tag is first placed within the tool. The device D is positioned behind that portion of the ear through which the tool is to be inserted. The tool is then moved through the ear forming a slit 12 in the ear. The movement of the insertion tool with tag contained therein continues through the aperture 40 in the disc 38 until the disc is positioned between the anchoring head 18 and the marking panel 14 on the skin traversing portion 26. Again, it can be seen that the tag is now more firmly held in the slit of the ear.

An alternative embodiment of this invention is seen in FIG. 5 wherein two locking devices D and D' are utilized to hold the tag in the animal's ear 10. The device D' is placed on the skin traversing portion 26 of the tag prior to the insertion of the tag into the slit 12. The anchoring head 18 is then inserted through the slit in the ear. Since the device D' is dimensionally greater than the slit, it cannot be inserted through the slit. The device D', therefore, is held between the ear and the marking panel 14 of the tag. The anchoring head is then inserted through the aperture 40 of locking device D. Locking device D is parallel to the plane of device D' and the animal's ear 10 is spaced between device D and device D'. The ear of the animal is then held between the two locking devices and the tag is held even more securely in the ear.

In another embodiment, a modified tag T' is illustrated in FIG. 6 with a locking device D. Tag T' is characterized by the absence of a fold in the skin traversing portion or neck 26 of the tag. A locking device, then, is generally perpendicular to the plane of the marking panel when the device is mounted on the skin traversing portion of the tag. The tag and locking device are positioned in the ear of an animal, as depicted in FIG. 6, by first inserting the tag upwardly through the top portion of the ear. The anchoring head 18 is then inserted through the aperture 40 of the device. Thus, the anchoring head is relatively higher vertically than the plane of the marking panel. It can be seen that the tag is generally co-planar throughout its length and the device is generally perpendicular to the plane of the tag. In this embodiment the device D also acts similarly to a pedestal in supporting the tag in the slit thereby diminishing any wobbling movement of the tag in the ear as the animal moves. This will minimize abrasion of the slit in the ear and permit faster healing.

In yet another embodiment, as seen in FIG. 7, the modified tag T' and locking device D are held in the slit in an animal's ear. Similar to the embodiment of FIG. 6, tag T' is generally co-planar throughout its length. The device D is also perpendicular to the plane of the marking panel and the device is placed on the skin traversing portion of the tag after the tag is inserted through the ear. In this embodiment, unlike the embodiment of FIG. 6, the tag is inserted downwardly through the top portion of the ear. Thus, the anchoring head 18 is relatively lower vertically than the plane of the marking panel 14. Again, it can be seen that in supporting the tag in the slit, the locking device acts similarly to a pedestal thereby lessening any wobbling motion of the tag in the ear during the animal's movement.

The invention has been described in detail with particular reference to a plurality of embodiments thereof, but it will be understood that variations and modifications can be affected within the spirit and scope of the invention.

What is claimed is:

1. The combination of a self-locking identification tag for insertion into the slit of the ear or like tissue of an animal and an additional locking device therefor, comprising:
    a tag including an anchoring head having a plurality of securing ledges, said ledges being bendable for inserting said ledges through the slit in the animal's tissue, said tag further including a marking panel, a skin traversing portion joining together said anchoring head and said marking panel, said anchoring head, said marking panel, and said skin traversing portion forming means to hold said tag in a slit in an animal's tissue; and
    at least a first generally circular locking device having an impervious periphery and a slit centrally disposed therein, said slit being substantially equal dimensionally to the cross-sectional dimension of said skin traversing portion, said slit being dimensionally less than said marking panel and being dimensionally less than said anchoring head portion where said skin traversing portion joins with said anchoring head, said anchoring head being insertable through said slit so said device is releasably held on said skin traversing portion to provide additional means to hold the tag in the slit in the animal's tissue.

2. The combination, as claimed in claim 1, wherein:
    said device is generally perpendicular to the plane of said tag, providing supporting means for said tag in the animal's tissue; and
    said anchoring head is co-planar with the plane of said marking panel.

3. The combination, as claimed in claim 1, wherein:
    said anchoring head includes at least two securing ledges bendable about the center portion of said anchoring head, said ledges are insertable through the slit in the animal's tissue and provide means for holding the tag therein.

4. The combination, as claimed in claim 1, further including:
    an insecticide impregnated into said device which will bleed therefrom over a period of time for application to the animal.

5. The combination of a self-locking identification tag for insertion into the slit of the ear or like tissue of an animal and an additional locking device therefor, comprising:
    a tag including an anchoring head, a marking panel, a skin traversing portion joining together said anchoring head and said marking panel, and forming means to hold said tag in a slit in an animal's tissue;
    at least a first locking device having an aperture therein, said anchoring head being insertable through said aperture so that said device is releasably held on said skin traversing portion to provide additional means to hold the tag in the slit in the animal's tissue; and
    a second locking device being generally parallel to the plane of said first locking device and having the animal's tissue held in spaced relation between said first device and said second device, and said second locking device forming additional means to hold said tag in the slit of the animal's tissue.

* * * * *